US012152432B2

(12) United States Patent
Vos

(10) Patent No.: US 12,152,432 B2
(45) Date of Patent: Nov. 26, 2024

(54) SUPPORT BRACKET FOR WINDOW INSTALLATION AND METHODS OF USE

(71) Applicant: Pella Corporation, Pella, IA (US)

(72) Inventor: Jaron E. Vos, Pella, IA (US)

(73) Assignee: Pella Corporation, Pella, IA (US)

(*) Notice: Subject to any disclaimer, the term of this patent is extended or adjusted under 35 U.S.C. 154(b) by 395 days.

(21) Appl. No.: 17/121,451

(22) Filed: Dec. 14, 2020

(65) Prior Publication Data

US 2021/0095516 A1 Apr. 1, 2021

Related U.S. Application Data

(62) Division of application No. 15/244,733, filed on Aug. 23, 2016, now Pat. No. 10,895,099.

(51) Int. Cl.

| | |
|---|---|
| ***E06B 1/60*** | (2006.01) |
| ***E04F 13/08*** | (2006.01) |
| ***E04F 21/00*** | (2006.01) |
| ***E06B 1/00*** | (2006.01) |
| ***E06B 1/36*** | (2006.01) |
| *E06B 1/62* | (2006.01) |

(52) U.S. Cl.

CPC ........ *E06B 1/6023* (2013.01); *E04F 13/0837* (2013.01); *E04F 21/0023* (2013.01); *E06B 1/003* (2013.01); *E06B 1/36* (2013.01); *E06B 1/60* (2013.01); *E06B 1/6015* (2013.01); *E06B 1/6069* (2013.01); *E06B 2001/628* (2013.01)

(58) Field of Classification Search

CPC .............. E04F 13/0837; E04F 21/0023; E04F 13/0823; E04F 13/0844; E04F 13/085; E06B 1/6023; E06B 1/6069; E06B 1/60; E06B 1/36; E06B 1/003; E06B 1/6015; E06B 2003/4484

USPC ........ 411/458, 466, 468; 52/213, 489.2, 361

See application file for complete search history.

(56) References Cited

U.S. PATENT DOCUMENTS

| | | | | |
|---|---|---|---|---|
| 1,504,172 A * | 8/1924 | Willey | B65D 90/08 | 52/700 |
| 1,651,392 A ‡ | 12/1927 | Honigbaum | A47G 1/22 | 248/217.3 |
| 1,697,456 A ‡ | 1/1929 | Carlson | E06B 1/6015 | 16/384 |

(Continued)

FOREIGN PATENT DOCUMENTS

| | | | |
|---|---|---|---|
| DE | 20003819 U1 * | 7/2001 | E06B 1/003 |
| DE | 202004002331 U1 ‡ | 5/2004 | E06B 1/6015 |

(Continued)

OTHER PUBLICATIONS

Abstract: DE 20003819 U1 (Jul. 2001) (Year: 2001).‡

(Continued)

*Primary Examiner* — Brent W Herring

(74) *Attorney, Agent, or Firm* — FAEGRE DRINKER BIDDLE & REATH LLP

(57) ABSTRACT

Various aspects of the present disclosure are directed toward apparatuses, systems, and methods for installing a closure assembly into a framed opening having sheathing arranged around the framed opening. The apparatuses, systems, and methods may include use of at least one support bracket along the framed opening and the sheathing.

7 Claims, 7 Drawing Sheets

(56) References Cited

U.S. PATENT DOCUMENTS 2,612,813 A * 10/1952 Cohn ..................... F24F 13/00 248/300
3,189,137 A ‡ 6/1965 Harris .................. E06B 1/6015 52/213
3,238,679 A ‡ 3/1966 Capoccia ................. E06B 1/26 52/204.55
3,298,651 A ‡ 1/1967 Passer ..................... A47G 1/20 248/217.2
3,320,705 A ‡ 5/1967 Downing, Jr. ........ E06B 1/6023 49/504
3,741,068 A ‡ 6/1973 Andruskiewicz ... E04F 13/0837 403/401
4,014,146 A * 3/1977 DiMascio ............ E06B 1/6015 52/211
4,443,025 A * 4/1984 Martin .............. B62D 53/0807 280/433
4,448,007 A ‡ 5/1984 Adams ............... E04F 13/0823 52/100
4,473,981 A ‡ 10/1984 Simpson ................ E06B 1/702 52/204
4,621,473 A * 11/1986 Wendt ................ E04F 13/0805 52/489.2
4,840,002 A ‡ 6/1989 Lovgren .............. E06B 1/6015 52/213
4,935,998 A ‡ 6/1990 Frazier .................. A47C 31/06 24/347
5,063,722 A * 11/1991 Hohmann .............. F16B 15/06 52/410
5,183,232 A ‡ 2/1993 Gale ..................... A47B 96/06 248/220.22
5,365,707 A ‡ 11/1994 Jones ....................... E06B 1/30 52/204.53
5,619,836 A ‡ 4/1997 Rouch ................ E04G 23/0203 52/715
5,966,878 A ‡ 10/1999 Freund ............... E04F 21/0023 248/30
6,044,611 A ‡ 4/2000 Brunett ................ E06B 1/6015 16/389
6,293,061 B1 ‡ 9/2001 Horak, Jr. ............ E06B 1/6015 52/213
6,311,449 B1 * 11/2001 Morse ..................... E04B 1/003 52/289
6,357,200 B1 ‡ 3/2002 Vanderpan ............... E06B 1/58 403/26
6,481,169 B1 * 11/2002 Ludwig ................ E04B 2/7453 52/745.1
6,615,500 B2 ‡ 9/2003 Hale ........................ G01C 9/28 33/194
6,895,718 B2 ‡ 5/2005 Moffatt ................ E06B 1/6015 52/204
7,162,841 B2 ‡ 1/2007 Kownacki ............ E06B 1/6053 403/382
7,398,623 B2 * 7/2008 Martel ................ F16B 15/0038 52/489.1
7,610,728 B1 ‡ 11/2009 Manocchia ............ E02D 27/01 248/357
7,637,076 B2 ‡ 12/2009 Vaughn ..................... F16B 9/01 52/838
7,669,382 B2 ‡ 3/2010 Burton ................. E06B 1/6069 52/745
7,721,400 B2 * 5/2010 Parent ..................... B25C 11/00 29/402.09
7,814,716 B2 ‡ 10/2010 Moffatt ................ E06B 1/6015 52/204
7,980,032 B2 ‡ 7/2011 Moffatt ................ E06B 1/6015 52/204
8,333,359 B2 ‡ 12/2012 Gordon ................ E06B 1/6015 248/223.21
8,621,795 B2 ‡ 1/2014 Peterson .................. E06B 1/60 52/213
8,667,765 B1 * 3/2014 McCarthy .......... E04F 13/0828 52/745.1
8,833,035 B2 ‡ 9/2014 Vos ........................ E06B 1/702 52/745
8,973,315 B2 ‡ 3/2015 Massey ..................... E06B 1/34 52/204
9,145,673 B1 ‡ 9/2015 Dantzer ........... E04F 15/02183
9,932,735 B1 * 4/2018 Biasucci ............... E04B 1/2612
9,933,000 B2 ‡ 4/2018 Conway ................. F16B 2/245
2002/0083677 A1 ‡ 7/2002 Nordland ............ B01D 21/245 52/698
2002/0108326 A1 ‡ 8/2002 Ackerman, Jr. .......... E06B 1/62 52/204.5
2004/0107653 A1 * 6/2004 Collie ..................... E04B 7/063 52/713
2004/0237443 A1 ‡ 12/2004 Haley ................ E04F 13/0823 52/545
2005/0218277 A1 * 10/2005 Shaw ...................... E04G 17/14 248/201
2007/0209314 A1 * 9/2007 Vaughn ..................... E04B 1/24 52/838
2008/0110110 A1 ‡ 5/2008 Burton ...................... E06B 1/58 52/213
2009/0025312 A1 ‡ 1/2009 Deans ....................... E04B 5/12 52/167.3
2012/0177435 A1 * 7/2012 Curtis ..................... E01C 11/02 29/525.01
2012/0198771 A1 * 8/2012 Weiss ................. E04F 21/0015 49/70
2015/0361653 A1 ‡ 12/2015 Grant ...................... E04B 1/625 52/302.1
2018/0058135 A1 3/2018 Vos

FOREIGN PATENT DOCUMENTS

DE 20311513 U1 ‡ 12/2004 ........... E06B 1/6076
DE 102011002245 A1 ‡ 10/2012 ............ E06B 1/003
DE 202016101375 U1 ‡ 5/2016 ........... E06B 1/6015
EP 2226456 A1 ‡ 9/2010 ............ E06B 1/003
EP 2631405 A1 ‡ 8/2013 ............ E06B 1/003
KR 200438474 Y1 ‡ 2/2008
KR 200439125 Y1 ‡ 3/2008
KR 100981307 B1 ‡ 9/2010
KR 101019219 B1 ‡ 3/2011
KR 2017-0000826 A 1/2017
KR 2017000040 U ‡ 1/2017
KR 2017000826 A ‡ 1/2017

OTHER PUBLICATIONS

Abstract: KR 690587 B1 (Mar. 2007) (Year: 2007).‡
Abstract: KR 2007070136 A (Jul. 2007) (Year: 2007).‡
Abstract: KR 2008030592 A, (Apr. 2008) (Year: 2008).‡
Abstract: KR 2010034444 A (Apr. 2010) (Year: 2010).‡
Abstract: KR 2010098761 A (Sep. 2010) (Year: 2010).‡
Abstract: KR 2010007525 U (Jul. 2010) (Year: 2010).‡
Abstract: KR 2011011760 U (Dec. 2011) (Year: 2011).‡
Abstract: KR 2011006645 U (Jun. 2011) (Year: 2011).‡
Abstract: KR 2014026916 A (Mar. 2014) (Year: 2014).‡
Abstract: KR 471050 Y1 (Jan. 2014) (Year: 2014).‡
Abstract: KR 2014004646 U (Aug. 2014) (Year: 2014).‡
Abstract: KR 1802838 B1 (Dec. 2017) (Year: 2017).‡

* cited by examiner
‡ imported from a related application

SUPPORT BRACKET FOR WINDOW INSTALLATION AND METHODS OF USE

TECHNICAL FIELD

The present invention relates closure assemblies and methods for installing closure assemblies into a rough opening.

BACKGROUND

One of the more time consuming jobs in the construction and restoration fields is the setting (i.e. installing, leveling, and plumbing) of closures assemblies such as doors, windows, side lights, transoms, gable air vents, portals, skylights, etc., in rough structural openings. The rough opening is typically slightly larger than the closure assembly to facilitate installation.

When closure assemblies, such as windows, are installed in a rough opening that includes a sheathing, all or a portion of the window is supported by the sheathing. In certain instances, the sheathing may be a soft material such as a foam board, which is less structurally supportive than other types of sheathing. As a result, it may be beneficial to provide additional structural support for the less structurally supporting sheathing during installation of a closure assembly.

SUMMARY

The present invention is directed to methods of installing closure assemblies in a rough opening in a structure. The present methods reduce the time and cost of installing closure assemblies, while maintaining thermal continuity between the structure and the closure assembly and increasing the performance of the closure assembly.

Various aspects of the present disclosure are directed toward methods of installing a closure assembly into a framed opening having sheathing arranged around the framed opening. In certain instances, the framed opening may be formed of a first material and the sheathing being formed of a second material. The second material may have a structural solidity that is less than a structural solidity of the first material. In these such instances, the methods may include arranging at least one support bracket along a first surface of the framed opening and along a first surface of the sheathing. The support bracket may have a horizontal portion that is substantially planar and a vertical portion. The methods may also include stabilizing the closure assembly on the support bracket and positioning the closure assembly along the support bracket and into the framed opening.

In certain instances, methods of installing a closure assembly, consistent with various aspects of the present disclosure, may include attaching a sheathing around a perimeter of a framed opening in a structure. The framed opening may be formed of a first material and the sheathing being formed of a second material. The second material may have a structural solidity that is less than a structural solidity of the first material. The methods may also include arranging a first support bracket along a first surface of the framed opening and along a first surface of the sheathing. The first support bracket may have a horizontal portion that is substantially planar and a vertical portion. Further, the methods may include positioning the closure assembly on the first support bracket and positioning the closure assembly along the first support bracket and into the framed opening.

Various aspects of the present disclosure are also directed toward support brackets for arranging a closure assembly into an opening having sheathing arranged around the opening. In certain instances, the support bracket may include a substantially planar portion and at least one projection arranged substantially perpendicular to the substantially planar portion. The projection may be configured to penetrate the sheathing and stabilize the support bracket therein.

Various aspects of the present disclosure are also directed towards system that include a rough opening in a structure and a sheathing around a perimeter of the rough opening. The systems may also include a first support bracket having a substantially planar portion and at least one projection configured to penetrate the sheathing. In addition, the support bracket may be configured to support a closure assembly on the sheathing during installation of the closure assembly into the rough opening.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
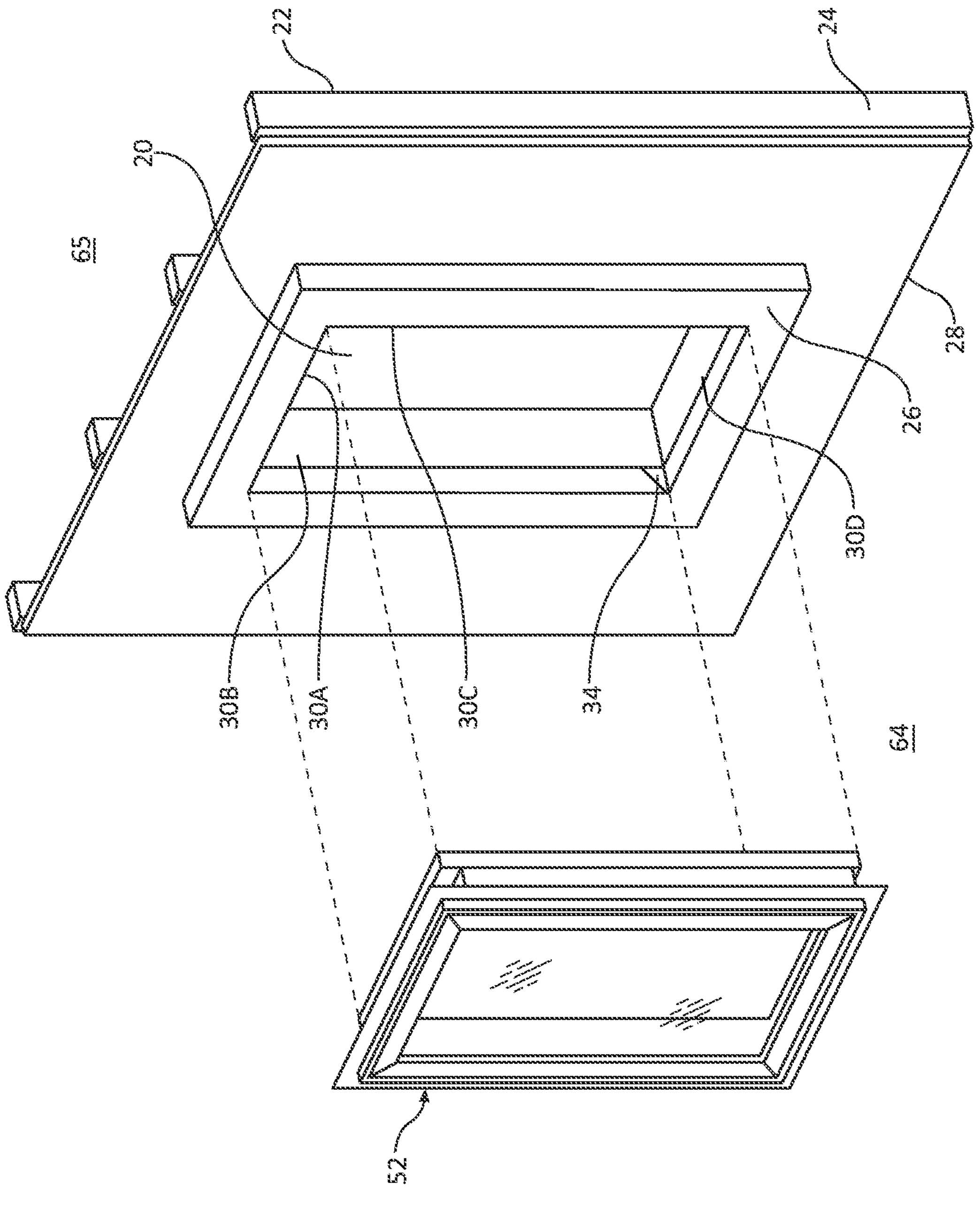
FIG. 1 is an exploded perspective view of a structure and a closure assembly in accordance various aspects of the present disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

As the terms are used herein with respect to ranges of measurements (such as those disclosed immediately above), "about" and "approximately" may be used, interchangeably, to refer to a measurement that includes the stated measurement and that also includes any measurements that are reasonably close to the stated measurement, but that may differ by a reasonably small amount such as will be understood, and readily ascertained, by individuals having ordinary skill in the relevant arts to be attributable to measurement error, differences in measurement and/or manufacturing equipment calibration, human error in reading and/or setting measurements, adjustments made to optimize performance and/or structural parameters in view of differences in measurements associated with other components, particular implementation scenarios, imprecise adjustment and/or manipulation of objects by a person or machine, and/or the like.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

The present invention is directed to a system for installing a closure assembly in a rough opening. As used herein, "closure" and "closure assembly" refer to double-hung, casement, awning and fixed windows, skylights, sliding and hinged doors, and the like. As used herein, "rough opening" refers to an opening in a wall or structure that has a perimeter sized and shaped to receive the closure assembly, and a plurality of inner surfaces. As used herein, "inner surfaces" refers to the sill, header and jamb surfaces forming the rough opening in the structure. The rough opening extends from an interior side of the structure to an exterior side. The exterior side of the structure is typically exposed to rain, wind, snow, ice and the like, while the interior side is typically protected from the elements.

FIG. 1 is an exploded perspective view of a structure 22 and a closure assembly 52 in accordance various aspects of the present disclosure. As shown in FIG. 1, the structure 22 may include frame members 24 and a sheathing 26. The structure 22 may also include a water resistant barrier 28 over the sheathing 26 (which may cover all of or a portion of the structure 22). In addition, a rough opening 20 extends through the structure 22 from an interior side 64 of the structure 22 to an exterior side 65 of the structure 22 and includes inner surfaces 30A, 30B, 30C, 30D in the structure 22 that may be defined by the frame members 24. In addition, the sheathing 26 may be a foam insulation layer, a layer of drywall and/or other materials (e.g., vapor barrier material). The sheathing 26 may provide thermal insulation between the structure 22 and the closure assembly 52.

To secure the closure assembly 52 within the structure 22, the closure assembly 62 may be arranged through and secured to the frame members 24 of the rough opening 20. As part of the installation process, the closure assembly 52 may be positioned along inner surfaces 34 of the sheathing 26, and at least partially supported by the sheathing 26. The sheathing 26, however, may be less structurally stable than the structure 22. For instance, the sheathing 26 may be formed of a first material that has a structural solidity (e.g., the ability to withstand force applied thereto) and/or stability that is less than a second material (e.g., lumber), of which the frame members 24 are formed.

Figure 2:
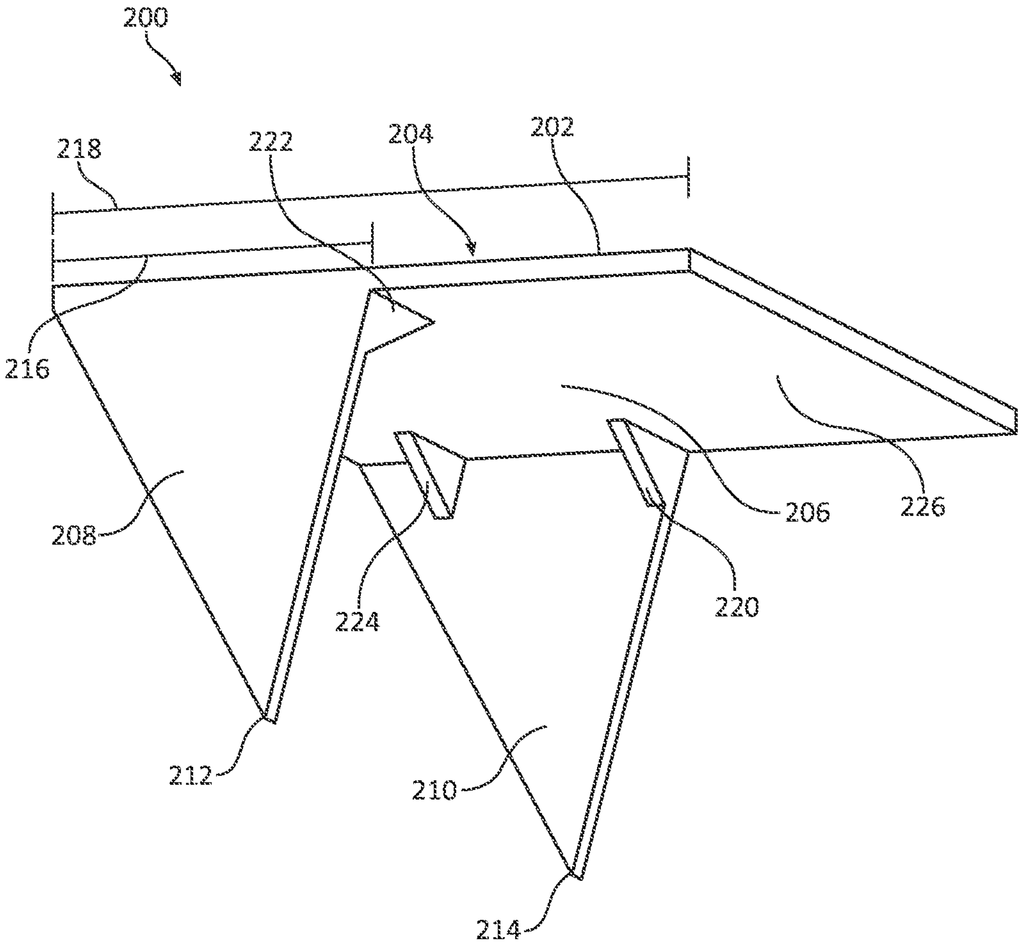
FIG. 2 is an example support bracket in accordance various aspects of the present disclosure.

FIG. 2 is an example support bracket 200 in accordance various aspects of the present disclosure. The support bracket 200 may be used for arranging a closure assembly into an opening having sheathing arranged around the opening (e.g., as discussed above with reference to FIG. 1). As noted above, a closure assembly (e.g., a window) may be positioned along and at least partially supported by the sheathing as part of installing the closure assembly within the opening. The support bracket 200 may include a substantially planar portion 202 that has a first surface 204 and a second surface 206.

The support bracket 200 may also include at least one projection 208, 210 arranged along the second surface 206 of the planar portion 202. As shown, the support bracket 200 includes two projections 208, 210. The projections 208, 210 may be arranged substantially perpendicular to the planar portion 202 and project away from the second surface 206. In addition, the projections 208, 210 may be configured to penetrate a material to stabilize the support bracket 200 therein. The support bracket 200 may be used in securing a closure assembly (e.g., a window, door, or the like) within a structure. As noted above with respect to FIG. 1, the structure may include sheathing arranged around a rough opening into which the closure assembly is to be installed. As part of the installation process, the closure assembly may be partially or fully supported by the sheathing. The sheathing may be a foam insulation layer, a layer of drywall and/or other materials, which may have a lower structural stability than the opening in the structure (e.g., framed lumber). Thus, one or more of the projections 208, 210 may penetrate the sheathing to stabilize the support bracket 200 therein.

In certain instances and as shown in FIG. 2, the projections 208, 210 taper away from the second surface 206 toward distal ends 212, 214 thereof. The distal ends 212, 214 of the projections 208, 210 may form a point or tip that is configured to assist in puncturing of the sheathing assist the projections 208, 210 penetrating into the sheathing to stabilize the support bracket 200. The projections 208, 210 may have a width 216 at the second surface 206 that is 20%, 30%, 40%, 50%, 60%, 70% (or any percentage therebetween) of a width 218 of the planar portion 202. In certain instances, the width 216 of the projections 208, 210 at the second surface 206 may be equal to a width of the sheathing.

The support bracket 200 may also include one or more support portions 220, 222, 224 arranged on the second surface 206 of the planar portion 202. The support portions 220, 222, 224 may project inwardly from a perimeter of the support bracket 200 and the support portions 220, 222, 224 may be perpendicular to the projections 208, 210. In addition, the support portions 220, 222, 224 may be configured to stabilize the support bracket 200 on the sheathing. The support bracket 200 may be arranged on any side of the opening/sheathing. The support bracket 200 may balance and stabilize the closure assembly on the sheathing and mitigate movement thereof. The support portions 220, 222, 224 may mitigate against rotation of the support bracket 200 resulting from the weight of the closure assembly and/or rotation of the closure assembly by distributing of forces applied by the closure assembly throughout the planar portion 202 of the support bracket 200. In certain instances, the support portions 220, 222, 224 may also be configured to penetrate the sheathing to assist in stabilizing the closure assembly on the support bracket 200.

In certain instances, the support bracket 200 may include an opening 226 through the planar portion 202. The opening 226 may provide a pathway through which an attachment mechanisms such as a nail, screw, or other a fixing member may be arranged to secure the support bracket 200 to a framed member.

The illustrative components shown in FIG. 2 are not intended to suggest any limitation as to the scope of use or functionality of embodiments of the disclosed subject matter. Neither should the illustrative components be interpreted as having any dependency or requirement related to any single component or combination of components illustrated therein. More specifically, the support bracket 200 shown in FIG. 2 may include any number of projections 208, 210 or support portions 220, 222, 224, the support portions 220, 222, 224 may have a greater or smaller width and length, and the support portions 220, 222, 224 may be intermittent, semi-continuous or continuous along the support bracket 200. In certain instances, a thickness of the support bracket 200 may be altered to provide further support if desired, In addition, the support bracket 200 may be constructed from a plastic, metal, or a composite material depending on strength/thermal requirements.

Figure 3A:
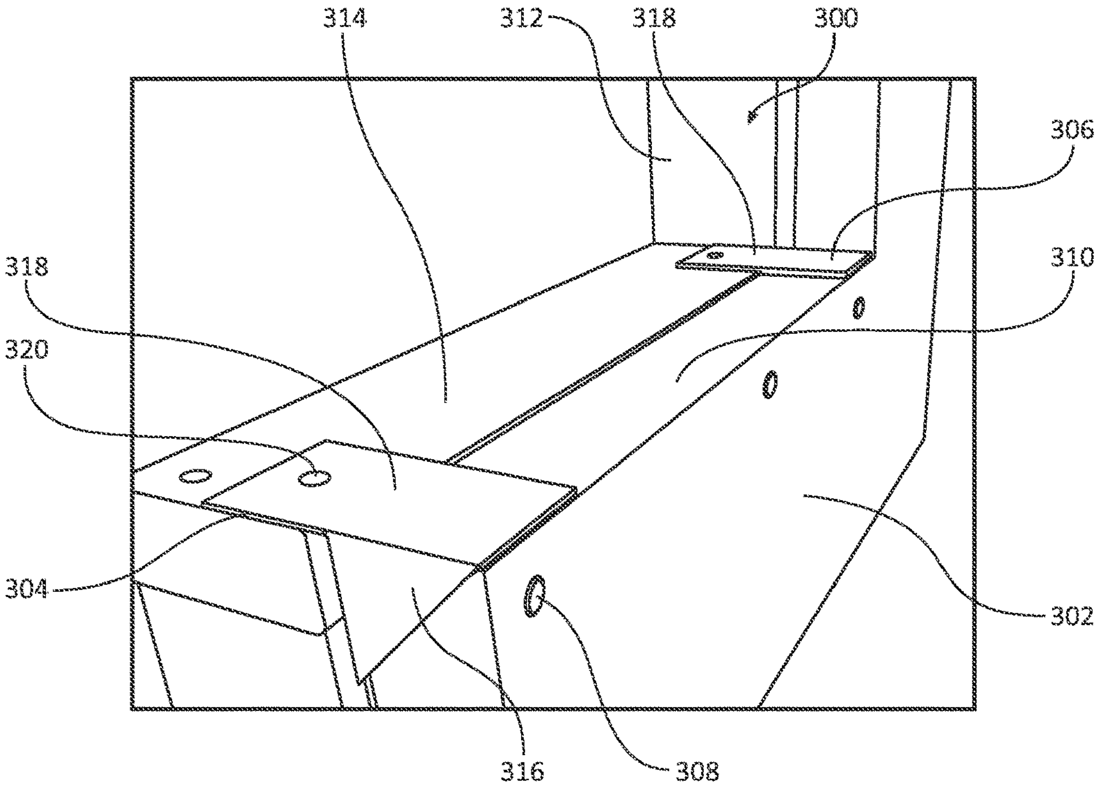
FIG. 3A is an example a framed opening having sheathing arranged around the framed opening and at least one support bracket in accordance various aspects of the present disclosure.

FIG. 3A is an example a framed opening 300 having sheathing 302 arranged around the framed opening 300 and at least one support bracket 304, 306 in accordance various aspects of the present disclosure. The framed opening 300 may be formed of lumber and the sheathing 302 may be formed of a foam board or similar insulative material. The foam board or similar insulative material may be between 1 inch and 6 inches in thickness. Thus, the framed opening 300 may have a structural stability/solidity that is greater than the sheathing 302. In certain instances, the sheathing 302 may be secured around a perimeter of the framed opening 300. The sheathing 302 may be secured around the perimeter of the framed opening 300 by fasteners 308 (e.g., nails, screws) or an adhesive between the sheathing 302 and the framed opening 300. In addition, the sheathing 302 may be arranged around the framed opening 300 and have external surfaces 310 that are planar with each of the surfaces of the framed opening 300. More specifically, the external surfaces 310 of the sheathing 302 may be arranged planar to the two vertical surfaces 312 and the two horizontal surfaces 314 of the framed opening 300.

As shown in FIG. 3A, the support brackets 304, 306 are arranged along one of the external surfaces 310 of the sheathing 302 and along one of the horizontal surfaces 314 of the framed opening 300. The support brackets 304, 306 each include at least one projection 316 and a substantially planar portion 318. Although only one projection 316 is shown, the support brackets 304, 306 include addition projections that are embedded into sheathing. The support brackets 304, 306 may also include support portions (e.g., as shown in FIG. 2). Embedding the projections 316 and/or support portions in the sheathing 302 may ensure stability of the support brackets 304, 306 by securing the support brackets 304, 306 to the sheathing 302. In addition, the embedding the projections and/or support portions of the support brackets 304, 306 may reinforce the support brackets 304, 306 within the sheathing. As discussed below with reference to FIG. 3B, a closure assembly 322 (shown in FIG. 3B) may be positioned on the support brackets 304, 306 in installing the closure assembly 322 in the framed opening 300. Embedding the projections and/or support portions of the support brackets 304, 306 within the sheathing 302 may enhance the ability of the support brackets 304, 306 to support a portion of or all of the weight of the closure assembly 322 on the support brackets 304, 306 and mitigate against the closure assembly 322 rotating during installing.

In certain instances, one or more of the support brackets 304, 306 may be arranged along one of the two vertical surfaces 312 of the framed opening 300 and along the corresponding exterior surfaces 310 of the sheathing 302. In these such instances, the support brackets 304, 306 being arranged along one of the two vertical surfaces 312 of the framed opening 300 and along the corresponding exterior surfaces 310 of the sheathing 302 may further mitigate against the closure assembly 322 rotating during installing.

Further yet, the support brackets 304, 306 may be attached to the framed opening 300 by a fixing member 320. The fixing member 320 may be a nail, screw or other similar structure that is arranged through the support brackets 304, 306. In other instances, the support brackets 304, 306 may be attached to the framed opening 300 by applying an adhesive between the framed opening 300 and the support bracket(s) 304, 306. In addition, the support brackets 304, 306 may include barbs, projections, prongs, spikes, or other similar structures on a bottom side that embed the support brackets 304, 306 within the framed opening 300.

Figure 3B:
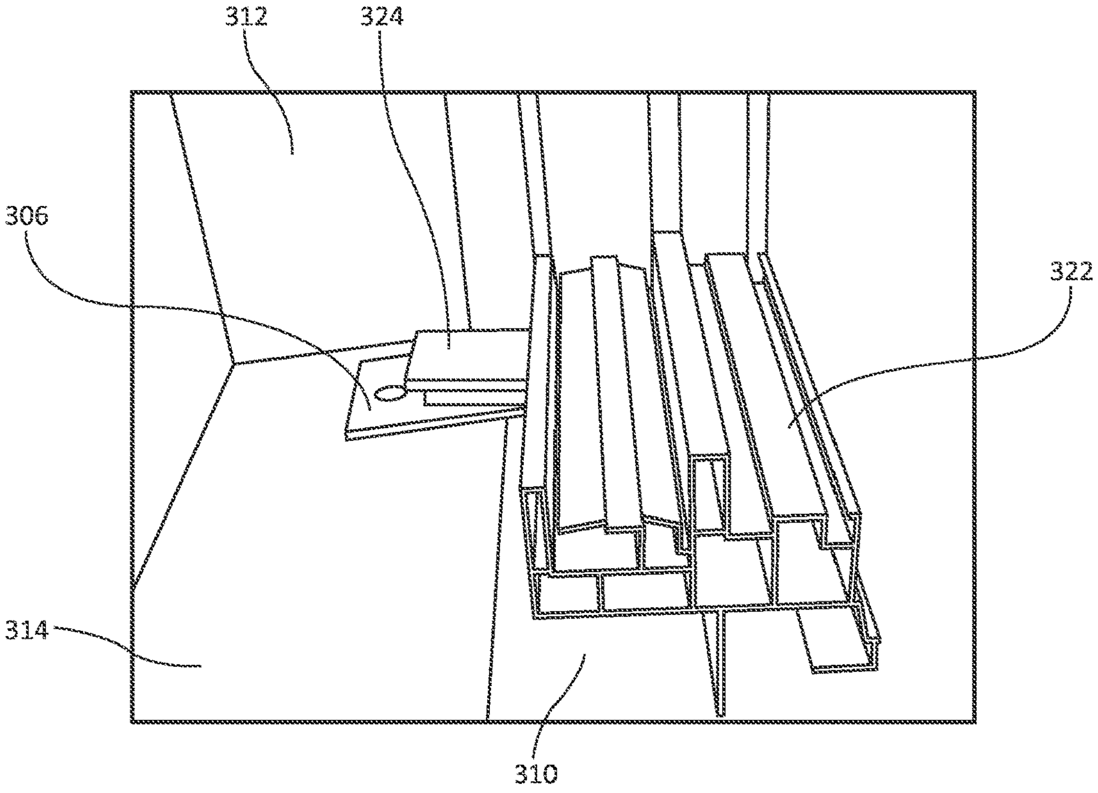
FIG. 3B is the framed opening and sheathing, shown in FIG. 3A, and a closure assembly in accordance various aspects of the present disclosure.

FIG. 3B is the framed opening 300 and the sheathing 302, shown in FIG. 3A, and the closure assembly 322 in accordance various aspects of the present disclosure. As shown in FIG. 3B, the closure assembly 322 is stabilized on the support bracket 306. As noted above, the support bracket 306 may be arranged along one of the horizontal surfaces 314 of the framed opening 300 and arranged along a corresponding external surface 310 of the sheathing 302. The support bracket 306 is configured to support the weight of the closure assembly 322 on the sheathing 302 and may mitigate against rotation of the closure assembly 322 caused by the wind or other forces that are the result of installing the closure assembly 322. In certain instances, a shim 324 may be arranged along and parallel with the substantially planar portion 318 of the support bracket 306 prior to stabilizing the closure assembly 322 on the support bracket 306.

The support brackets 304, 306 may be installed at points where the closure assembly 322 requires support (e.g., shimming locations). This permits the sheathing 302 to be installed up to the framed opening 302, which maintains the thermal continuity of the installation, does not require a change to the framed opening 302 size. This may reduce time and labor and material during installation of the closure assembly 322 in sheathed wall with improved installation and thermal performance. More specifically, the support brackets 304, 306 support the closure assembly 322 during installation such that no addition lumber or other materials are required. Additional lumber or materials may interrupt the thermal continuity of the sheathing 302 and increase installation time.

Figure 4A:
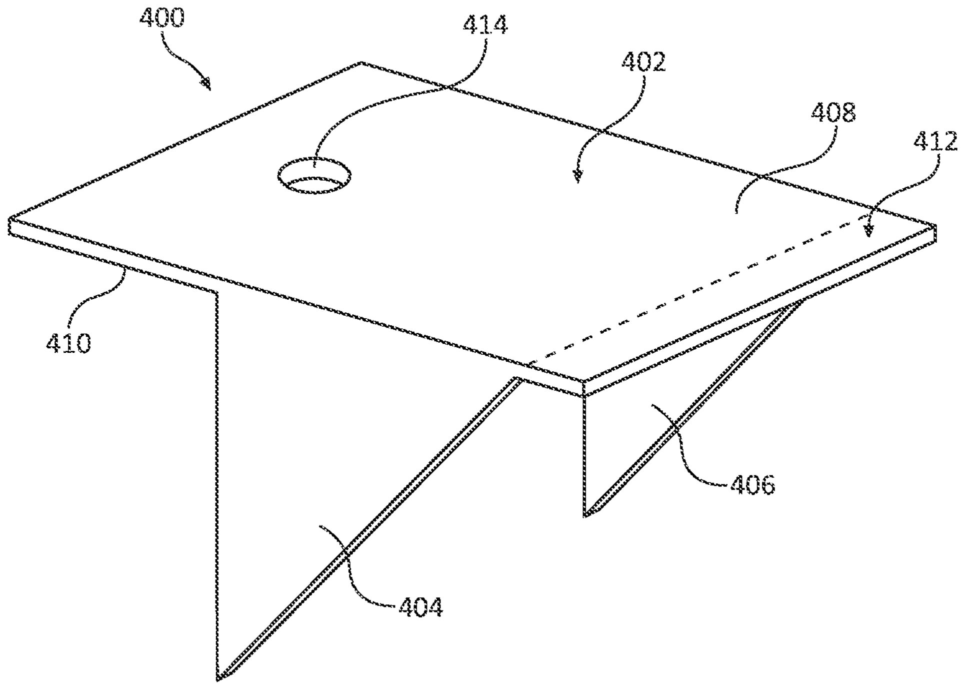
FIG. 4A is perspective view of another example support bracket in accordance various aspects of the present disclosure.

FIG. 4A is perspective view of another example support bracket 400 in accordance various aspects of the present disclosure. The support bracket 400 may be used for arranging a closure assembly into an opening having sheathing arranged around the opening (e.g., as discussed above with reference to FIG. 1). As noted above, a closure assembly (e.g., a window) may be positioned along and at least partially supported by the sheathing as part of installing the closure assembly within the opening.

The support bracket 400 may include a substantially planar portion 402, a first projection 404, and a second projection 406. The projections 404, 406 may be arranged substantially perpendicular to the planar portion 402. The substantially planar portion 402 may include an upper surface 408 and a lower surface 410, with the projections 404, 406 being arranged with and project away from the lower surface 410. The projections 404, 406 may be configured to penetrate a material to stabilize the support bracket 400 therein. As noted above with respect to FIGS. 3A-B, the support bracket 400 may be used in securing a closure assembly (e.g., a window, door, or the like) within a structure having sheathing arranged around a rough opening into which the closure assembly is to be installed. In certain instances, one or more of the projections 404, 406 may penetrate the sheathing to stabilize the support bracket 400 therein.

The support bracket 400 may balance and stabilize the closure assembly on the sheathing and mitigate movement thereof. More specifically, the projections 404, 406 may mitigate against rotation of the support bracket 400 resulting from the weight of the closure assembly and/or rotation of the closure assembly by distributing of forces applied by the closure assembly throughout the planar portion 402 of the support bracket 400.

Figure 4B:
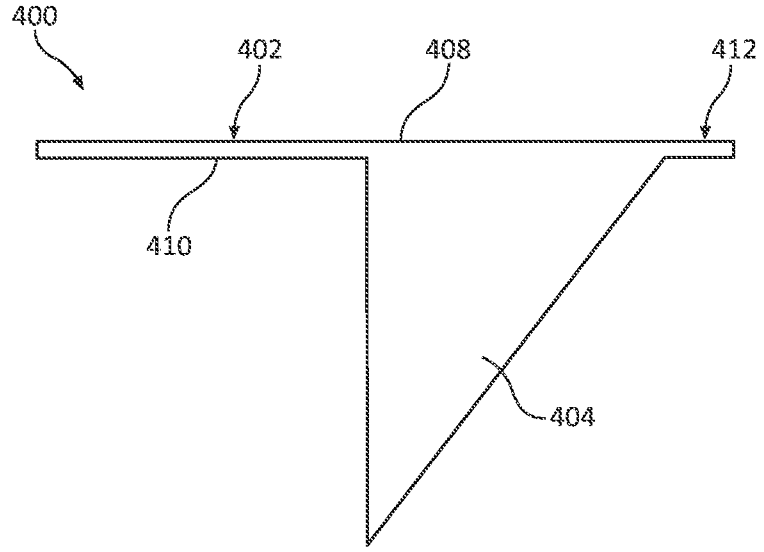
FIG. 4B is a side view of the support bracket, shown in FIG. 4A, in accordance various aspects of the present disclosure.

The support bracket 400 may also include a break-away portion 412. The break-away portion 412 is configured to separate from the planar portion 402. As shown in FIG. 4B, the break-away portion 412 extends distally of the projections 404, 406. The projections 404, 406 may penetrate the sheathing to stabilize the support bracket 400 therein. The break-away portion 412 may allow the support bracket 400 to be used on multiple sheathing thicknesses. After embedding the projections 404, 406 within sheathing, for example, only the planar portion 402 may cover a top surface of the sheathing, or both of the break-away portion 412 and the planar portion 402 may cover a top surface of the sheathing. In instances where only the planar portion 402 covers the top surface of the sheathing, the break-away portion 412 may be removed. In instances where both of the break-away portion 412 and the planar portion 402 may cover a top surface of the sheathing, the break-away portion 412 may remain with the planar portion 402. 2" and 1.5" are common thicknesses for insulating sheathing, thus, the break-away portion 412 may be left in place for 2" thickness and removed for 1.5" thickness.

In certain instances, the support bracket 400 may include an opening 414 through the planar portion 402. The opening 414 may provide a pathway through which an attachment mechanisms such as a nail, screw, or other fixing member may be arranged to secure the support bracket 400 to a framed member.

The illustrative components shown in FIGS. 4A-B are not intended to suggest any limitation as to the scope of use or functionality of embodiments of the disclosed subject matter. Neither should the illustrative components be interpreted as having any dependency or requirement related to any single component or combination of components illustrated therein. More specifically, the support bracket 400 shown in FIGS. 4A-B may include any number of projections or include support portions (e.g., as shown in FIG. 2). In addition, the support bracket 400 may be constructed from a plastic, metal, or a composite material depending on strength/thermal requirements.

Figure 5A:
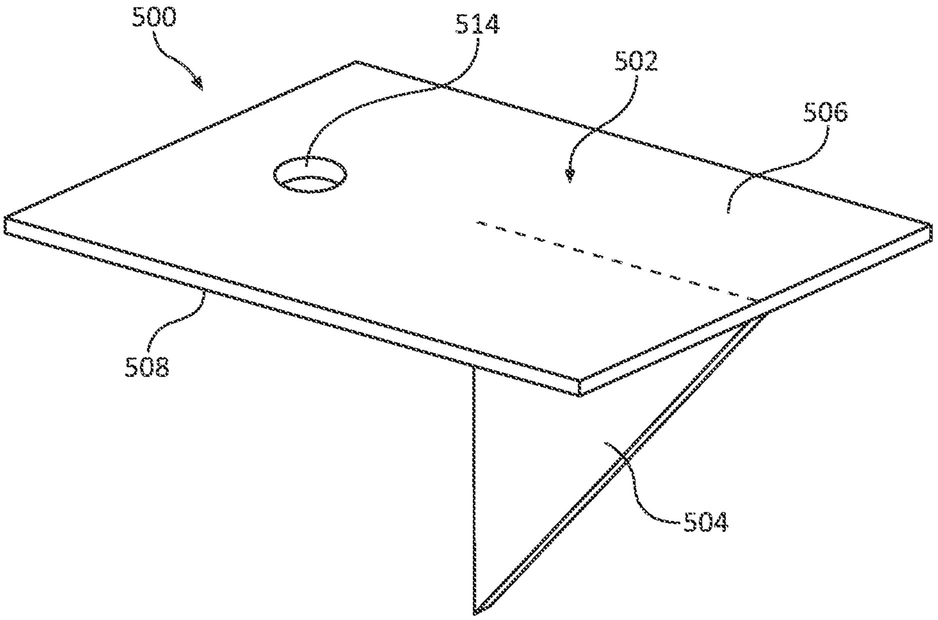
FIG. 5A is perspective view of another example support bracket in accordance various aspects of the present disclosure.

FIG. 5A is side view of another example support bracket 500 in accordance various aspects of the present disclosure. The support bracket 500 may be used for arranging a closure assembly into an opening having sheathing arranged around the opening (e.g., as discussed above with reference to FIG. 1). As noted above, a closure assembly (e.g., a window) may be positioned along and at least partially supported by the sheathing as part of installing the closure assembly within the opening.

The support bracket 500 may include a substantially planar portion 502 having an upper surface 506 and a lower surface 508. In addition, the support bracket 500 may include a projection 504. The projection 504 may be arranged on the lower surface 508, and extend away therefrom. In addition, the projection 504 may substantially perpendicular to the planar portion 502. The projection 504 may be configured to penetrate a material to stabilize the support bracket 500 therein. As noted above with respect to FIGS. 3A-B, the support bracket 500 may be used in securing a closure assembly (e.g., a window, door, or the like) within a structure having sheathing arranged around a rough opening into which the closure assembly is to be installed. The projection 504 penetrates the sheathing to stabilize the support bracket 500 therein.

In certain instances, the support bracket 500 may include an opening 514 through the planar portion 502. The opening 514 may provide a pathway through which an attachment mechanisms such as a nail, screw, or other a fixing member may be arranged to secure the support bracket 500 to a framed member.

Figure 5B:
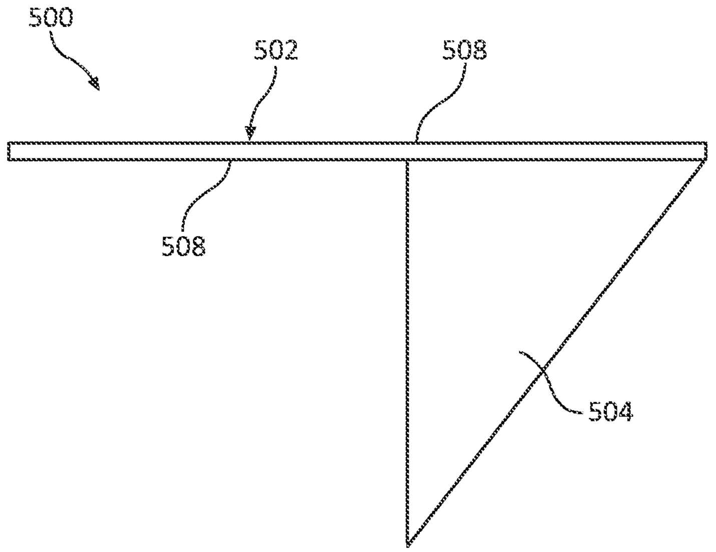
FIG. 5B is side view of the example support bracket, shown in FIG. 5A, in accordance various aspects of the present disclosure.

FIG. 5B is side view of the example support bracket 500, shown in FIG. 5A, in accordance various aspects of the present disclosure. As shown in FIG. 5B, the projection 504 tapers as is projects away from the lower surface 508. In addition, the projection 504 may taper toward a mid-point of the planar surface 502. In addition, the projection 504 may have a greater or lesser width at the lower surface 508 of the planar portion 502. The support bracket 500 may balance and stabilize the closure assembly on the sheathing and mitigate movement thereof. More specifically, the projection 504 may mitigate against rotation of the support bracket 500 resulting from the weight of the closure assembly and/or rotation of the closure assembly by distributing of forces applied by the closure assembly throughout the planar portion 502 of the support bracket 400.

Figure 5C:
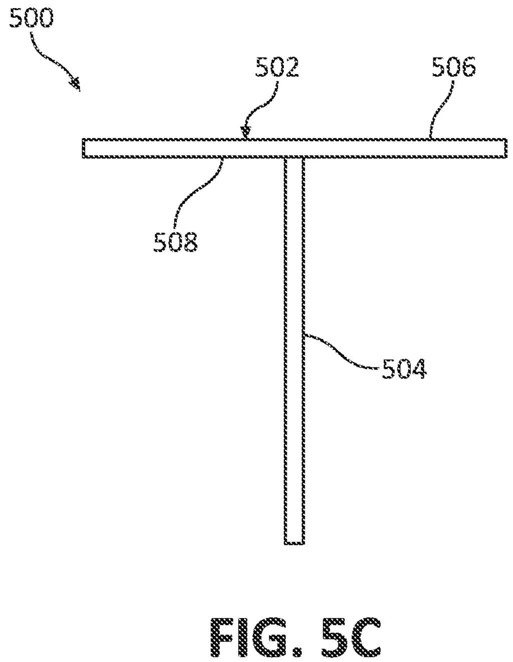
FIG. 5C is front view of the example support bracket, shown in FIGS. 5A-B, in accordance various aspects of the present disclosure.

FIG. 5C is front view of the example support bracket 500, shown in FIGS. 5A-B, in accordance various aspects of the present disclosure. As shown in FIG. 5C, the projection 504 is aligned with a middle line of the planar portion 502. As a result, the support bracket 500 is "T" shaped.

The illustrative components shown in FIGS. 5A-C are not intended to suggest any limitation as to the scope of use or functionality of embodiments of the disclosed subject matter. Neither should the illustrative components be interpreted as having any dependency or requirement related to any single component or combination of components illustrated therein. More specifically, the support bracket 500 shown in FIGS. 5A-C may include any number of projections or include support portions (e.g., as shown in FIG. 2) on either side of the projection 504. In addition, the support bracket 500 may be constructed from a plastic, metal, or a composite material depending on strength/thermal requirements.

Figure 6:
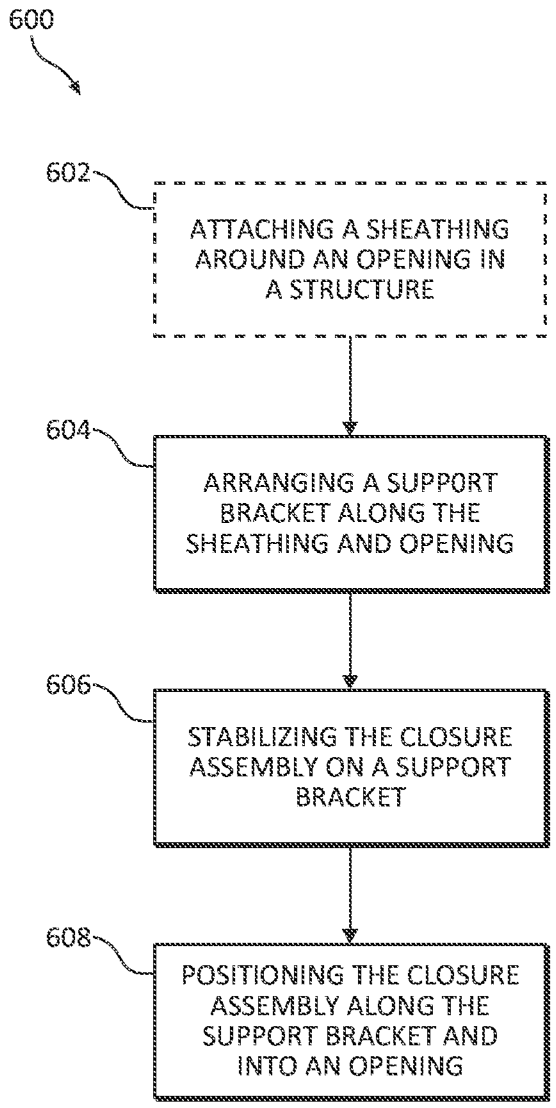
FIG. 6 is a flow chart of an example method of installing a closure assembly into a framed opening in accordance with embodiments of the disclosure.

FIG. 6 is a flow chart 600 of an example method of installing a closure assembly into a framed opening in accordance with embodiments of the disclosure. In certain instances, the framed opening is formed of a first material and the sheathing is formed of a second material having a structural solidity less than a structural solidity of the first material. In certain embodiments and as illustrated at block 602, the method of installing the closure assembly into the framed opening may include attaching a sheathing around a perimeter of the framed opening in a structure. As noted above with reference to, for example, FIG. 1 and FIGS. 3A-B, the framed opening may be formed of a first material and the sheathing may be formed of a second material. The second material (e.g., foam insulation) may have a structural solidity less than a structural solidity of the first material (e.g., lumber).

As is illustrated at block 604, the method may also include arranging at least one support bracket (that includes a substantially planar portion) along a first surface of the framed opening and along a first surface of the sheathing.

More specifically, the framed opening may include two vertical surfaces (left and right surfaces of the framed opening) and two horizontal surfaces (upper and lower surfaces of the framed opening). The sheathing may be arranged around the framed opening and have external surfaces that are planar with each of the two vertical surfaces and the two horizontal surfaces of the framed opening. In certain instances, methods, consistent with various aspects of the disclosure, may include arranging a first support bracket and a second support bracket along one or more of the two vertical surfaces and the two horizontal surfaces. More specifically, the methods may include arranging a first support bracket along one of the horizontal surfaces (such as the lower surface), and a second support bracket along one of the vertical surfaces. In addition, the first support bracket and the second support bracket, in these instances, will be arranged along the corresponding external surfaces of the sheathing that surround the two vertical surfaces and the two horizontal surfaces of the framed opening.

In certain instances, the support bracket(s) may be attached to one or more of the two vertical surfaces and the two horizontal surfaces of the framed opening. The support bracket(s) may be attached to the framed opening by nailing, screwing, or otherwise positioning a fixing member through the support bracket(s). In other instances, the support bracket(s) may be attached to the framed opening by applying an adhesive between the framed opening and the support bracket(s). In addition, the support bracket(s) may include barbs, projections, prongs, spikes, or other similar structures on a bottom side (the side that is arranged across the vertical surfaces or the horizontal surfaces of the framed opening). The barbs, projections, prongs, spikes, or other similar structures may hold the support bracket(s) in place. The support bracket(s) may be formed of a plastic, metal, or other similar materials. Further yet, attaching the support bracket(s) may also include attaching the support bracket(s) to the sheathing. The support bracket(s) may include projections and/or support portions (e.g., as shown in FIG. 2). Thus, the methods may include embedding a portion of the support bracket(s), such as projections and/or support portions, within the sheathing. Embedding the projections and/or support portions may ensure stability of support bracket by securing the support bracket to the sheathing. In addition, the embedding the projections and/or support portions may reinforce the support bracket within the sheathing and enhance the ability of the support bracket to mitigate against rotational forces and support the closure assembly on the sheathing.

As is illustrated at block 606, the method further includes stabilizing the closure assembly on the support bracket. As noted above, the first support bracket may be arranged along one of the horizontal surfaces of the framed opening and arranged along a corresponding external surface of the sheathing. Arranging the first bracket in this manner may allow the first bracket to support the weight of the closure assembly on the foam sheathing. The first bracket may mitigate against rotation of the closure assembly caused by the wind or other forces that are the result of installing the closure assembly. Further, and as noted above, the second support bracket may be arranged along one of the vertical surfaces of the framed opening and arranged along a corresponding external surface of the sheathing. Arranging the second bracket in this manner may allow the second bracket to assist in mitigation against rotation of the closure assembly. In certain instances, the methods, consistent with various aspects of the present disclosure may include arranging a shim along the substantially planar portion of the support bracket(s) prior to stabilizing the closure assembly on the support bracket.

In addition and as is illustrated at block 608, the method may include positioning the closure assembly along the support bracket and into the framed opening. As noted above, the sheathing may be arranged around the framed opening and have external surfaces that are planar with each of the two vertical surfaces and the two horizontal surfaces of the framed opening. As a result of arranging the support bracket(s) along one or more of the two vertical surfaces and the two horizontal surfaces the framed opening and exterior surface of the sheathing, the support bracket(s) maintain thermal continuity between the sheathing and the framed opening. Arranging the support bracket(s) in this manners permits the sheathing (e.g., foam board) to be installed up to the opening to maintain the thermal continuity of the installation. Further, arranging the support bracket(s) as discussed herein does not require a change to the opening size by non-intrusively supporting the closure assembly during installation.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A system comprising:
a rough opening in a structure;
a sheathing around a perimeter of the rough opening; and
a support bracket having,
- a substantially planar portion having a first end and a second end,
- at least one projection configured to penetrate the sheathing, the projection tapering away from the substantially planar portion toward a distal end of the at least one projection, and
- at least one support portion extending inwardly from a perimeter of the substantially planar portion along a lower surface of the substantially planar portion configured to penetrate the sheathing, the at least one support portion being offset from the first and second ends of the substantially planar portion, and the support bracket being configured to support a closure assembly on the sheathing during installation of the closure assembly into the rough opening.

2. The support bracket of claim 1, wherein the at least one support portion includes a first portion arranged perpendicular to the at least one projection along the lower surface of the substantially planar portion.

3. The system of claim 1, wherein the at least one support portion includes two support portions arranged at or adjacent opposing ends of the at least one projection.

4. The system of claim 3, wherein each of the two support portions include a triangular shape and being arranged perpendicular to the projection tapering away from and extending inwardly relative to the perimeter of the horizontal portion.

5. The system of claim 1, wherein the at least one projection and the at least one support portion are generally triangular in shape.

6. The system of claim 1, wherein the at least one projection is greater in size than the at least one support portion.

7. The system of claim 1, further including an attachment mechanism through the at least one support bracket and into a surface of the rough opening.

* * * * *